O. T. PRICE.
CONTINUOUS DISPLAY MOTION PICTURE DEVICE.
APPLICATION FILED OCT. 25, 1915.
1,181,478.  Patented May 2, 1916.
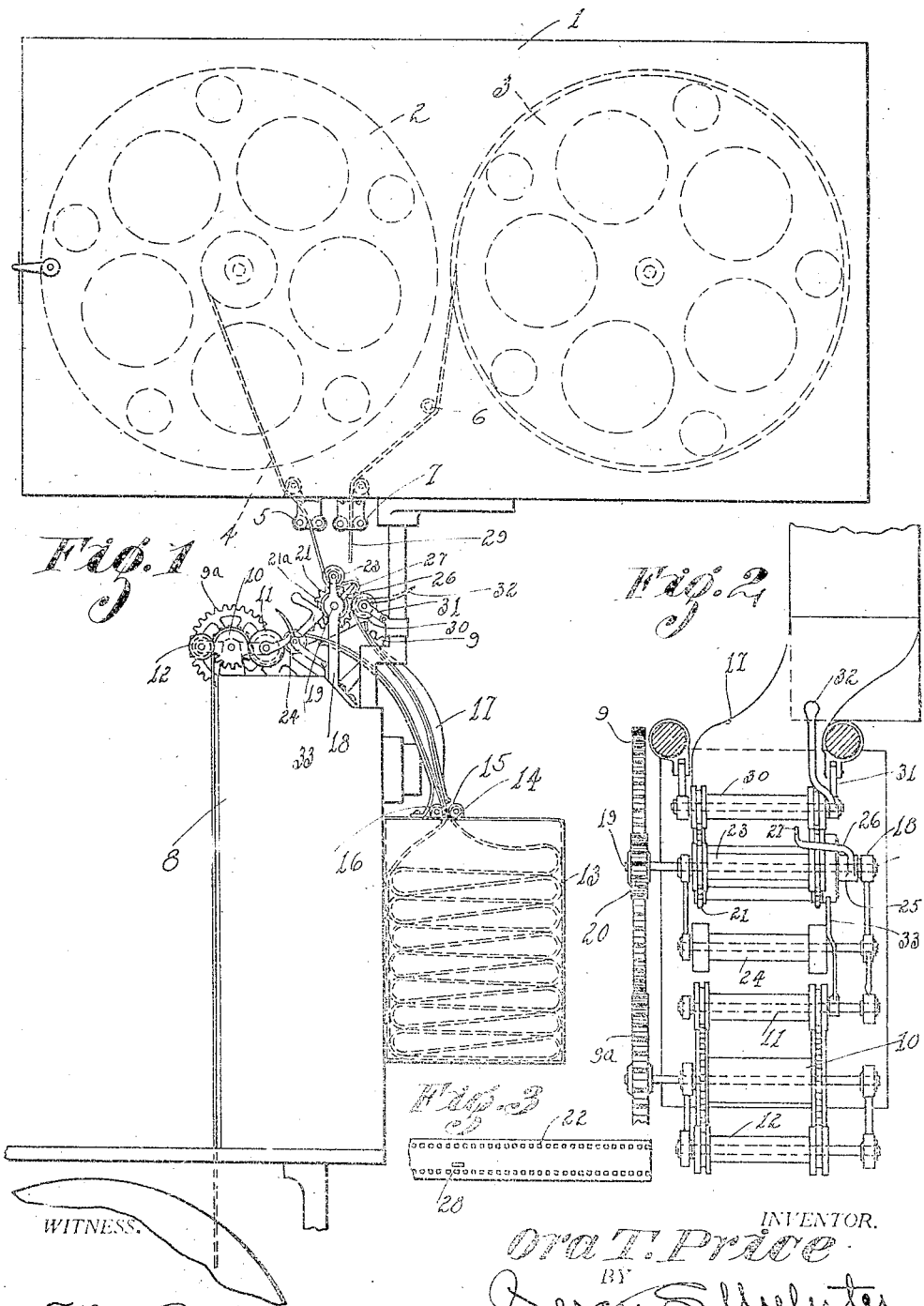
WITNESS.
Floyd M Blanchard
INVENTOR.
Ora T. Price
BY
Percy Webster
ATTORNEY.

UNITED STATES PATENT OFFICE.

ORA T. PRICE, OF CHICO, CALIFORNIA.

CONTINUOUS-DISPLAY MOTION-PICTURE DEVICE.

1,181,478.

Specification of Letters Patent.

Patented May 2, 1916.

Application filed October 25, 1915. Serial No. 57,706.

*To all whom it may concern:*

Be it known that I, ORA T. PRICE, a citizen of the United States of America, residing at Chico, in the county of Butte, State of California, have invented certain new and useful Improvements in Continuous-Display Motion-Picture Devices; and I do declare the following to be a full, clear, and exact description of the same, reference being had to the accompanying drawings, and to the characters of reference marked thereon, which form a part of this application.

This invention relates to an improvement in display cameras for motion pictures, the object of the invention being to produce an attachment for the cameras whereby several reels may be connected together during the display period without the necessity of stopping the operation of the camera between the display of the different reels or the operating of two machines as is now often done.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.
In the drawings similar characters of reference indicate corresponding parts in the several views.

Figure 1 is a side elevation showing a portion of the operating means of the camera with my improved device applied thereto. Fig. 2 is a top plan view of the same. Fig. 3 is a plan view of a fragmentary portion of a film showing a trip opening therein.

Referring now more particularly to the characters of reference on the drawings, the numeral 1 designates the magazine for the reels, which, in my improved device, is made large enough to carry two reels at one time, these reels being indicated by the numerals 2 and 3. The film 4 from the reel 2 passes out between the guide rollers 5, and the film 6 from the reel 3 passes out between independent rollers 7 disposed adjacent the rollers 5, as shown clearly in Fig. 1.
The numeral 8 designates generally the casing of the camera containing the operating means, reflectors, etc., for throwing the pictures upon the screen, but in view of the fact that my improved invention does not affect this structure I have not shown the same in detail in the drawings as it would only confuse the issue.

The numeral 9 designates the main driving pinion of the camera which operates a pinion $9^a$ to drive the advancing sprockets 10 over which the film moves, and the numerals 11 and 12 designate the rollers now commonly coöperating with the driving sprockets 10. Ordinarily, in the present day form of cameras, the film 4 after leaving the rollers 5 passes under the rollers 11, thence over the sprockets 10 and between the sprockets 10 and the rollers 12 and thence passes into the reflecting and lighting apparatus of the camera. By reason of this now commonly used structure, when the end of the film is reached, it becomes necessary to stop the camera to substitute a new reel or else have another camera ready to immediately be operated to display the new film.

My new attachment is designed to throw out a considerable amount of slack on the film as it reaches its end, which slack is then moved under the rollers 11 without moving the extreme end of the film and hence this end of the film can be attached to the end of the film on the adjacent reel and then the operation of the device continued in the ordinary way, continuing on with the new film without stopping. This is accomplished by means of the following structure and operation, viz: On the forward end of the camera and slightly to one side thereof, I provide what I will term a storage receptacle or box 13 having an opening at 14 disposed on each side of which are rollers 15 and 16. A metal chute or guide 17 leads to and opens between the rollers 16. Near the opposite end of the chute 17, I provide a supporting bracket 18 mounted in which is a shaft 19 having on one end a pinion 20 engaging the pinion 9. The relative size of the pinion 20 with respect to the pinion $9^a$ is such that with the operation of the pinion 9 the pinion 20 will be rotated much more rapidly than the pinion $9^a$, for a purpose as will appear. On the shaft 19 are sprockets 21 on a sleeve $21^a$ normally turnably mounted on the said shaft 19, said sprocket being arranged to engage the sprocket engaging perforations 22 of the film. The said sprockets 21 are disposed at the upper open end of the chute 17 which flares outwardly on its edges as shown. By reason of the sprockets 21 being normally freely turnable with respect to the shaft 19, under the normal advancement of the film, the said film will move under guide rollers 23 which hold it into engagement with the sprockets 21 and will then move over small guide rollers 24 adjacent the rollers 11, which rollers 24 will guide it under the rollers 11 and thence onto the sprockets 10. On the shaft 19 is keyed a clutch 25 arranged to be turned to form engagement between the shaft 19 and the sleeve 21ª whereby such sleeve and the sprockets 21 may rotate with the shaft 19. On the clutch 25 is a finger member 26 which bends inwardly and extends over one of the sprockets 21 where it is provided with an engaging point 27.

When the film on one reel reaches within a few feet of the end, the operator turns the clutch 25 to engage the sleeve 21ª and thereafter the shaft 19 and the sprockets 21 rotate together. Since the pinion 20 moves faster than the pinion 9ª, this will operate the sprockets 21 faster than the sprockets 10 which will cause the film to advance a considerable amount of slack, which slack moves downwardly through the chute 17 into the receptacle 13 where it folds up substantially as shown by dotted lines in Fig. 1, which folds are moved out of the receptacle 13 with the rotation of the sprockets 10 slower than they are fed into such receptacle. In this way a considerable amount of the film is still in the receptacle 13 when the end is reached adjacent the sprockets 21. Just previous to the end of the film reaching the sprockets 21, a point 27 engages a small tripping perforation 28 cut in the film and then as the film moves farther ahead it turns the arm 26 and clutch 25 to disengage the clutch 25 from the sleeve 21ª and the sprockets 21 come to a stop, the end of the film then coming also to a stop by reason of the slack being stored in the receptacle 13. Then, while this slack is being taken up by the movement of the sprockets 10, the operator may grasp the end of the film and with suitable adhesive material attach it to the adjacent film, the end of which is depending from its rollers, as at 29. Then by the time the slack in the receptacle 13 is all used up this joining of the films has been completed and the new film is advanced onto the sprockets 21, thence over the rollers 24 under the rollers 11 and then under the sprockets 10 in one continuous uninterrupted motion. This operation just described may be repeated for as many reels as are desired. While the film is moved into the receptacle 13, it is held in connection with the sprockets 21 by means of rollers 30 mounted on pivotally spring pressed arms 31 which are provided with a finger member 32 for moving the rollers for the purpose of starting the film between said rollers and said sprockets. Guide members 33 are disposed adjacent the sprockets 21 and rollers 24 to prevent the film from jumping sidewise off of the same as the slack is being taken up from the receptacle 13.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. The combination with a film delivery means and a normal advancing mechanism for the film, of a means arranged between the two for advancing, at predetermined times, a quantity of the film from the delivery means faster than its advancement by the normal advancing mechanism whereby two films may be joined without interrupting the operation of the normal advancing mechanism, as described.

2. The combination with a film delivery means and a normal advancing mechanism for the film, of a means arranged between the two for advancing, at predetermined times, a quantity of the film from the delivery means faster than its advancement by the normal advancing mechanism whereby two films may be joined without interrupting the operation of the normal advancing mechanism, and a box for receiving and storing said quantity of film, as described.

3. The combination with a film delivery means and a normal advancing mechanism for the film, of a means arranged between the two for advancing, at predetermined times, a quantity of the film from the delivery means faster than its advancement by the normal advancing mechanism whereby two films may be joined without interrupting the operation of the normal advancing mechanism, a box for receiving and storing said quantity of film, such box having a flaring opening to receive and discharge the film, as described.

4. A device of the character described comprising the combination with film advancing sprockets, other sprockets disposed adjacent the first named sprockets and arranged to be advanced at a greater speed than the first named sprockets, and means for throwing the second named sprockets in and out of motion, as described.

5. A device of the character described comprising the combination with a film advancing mechanism, of a shaft arranged to be driven at a greater speed than the shaft of the film advancing mechanism, a sleeve on said shaft, advancing members on said sleeve arranged to be engaged by the film, a clutch on the shaft arranged to be engaged with the sleeve to rotate said sleeve in unison with the shaft, and a member engageable by the film to throw the clutch out of engagement, as described.

6. A device of the character described comprising the combination with a film advancing mechanism, of a shaft journaled adjacent the same and arranged to be driven at a greater speed than the shaft of the advancing mechanism, a sleeve turnably mounted on the shaft, film engaging means on the sleeve, a clutch arranged to be engaged between the shaft and the sleeve to rotate the sleeve with the shaft, a projecting member on the clutch arranged to be engaged by a perforation in the film whereby with the engagement of the film the clutch will be disengaged, as described.

In testimony whereof I affix my signature.

ORA T. PRICE.